United States Patent
Koehl et al.

(10) Patent No.: US 10,428,691 B2
(45) Date of Patent: Oct. 1, 2019

(54) BEARING DEVICE FOR A TURBOCHARGER AND TURBOCHARGER

(71) Applicant: IHI CHARGING SYSTEMS INTERNATIONAL GMBH, Heidelberg (DE)

(72) Inventors: Wolfgang Koehl, Darmstadt (DE); Richard Markert, Darmstadt (DE); Martin Kreschel, Mannheim (DE)

(73) Assignee: IHI CHARGING SYSTEMS INTERNATIONAL GMBH, Heidelberg (DE)

( * ) Notice: Subject to any disclaimer, the term of this patent is extended or adjusted under 35 U.S.C. 154(b) by 536 days.

(21) Appl. No.: 15/173,638

(22) Filed: Jun. 4, 2016

(65) Prior Publication Data

US 2016/0281535 A1    Sep. 29, 2016

Related U.S. Application Data

(63) Continuation-in-part of application No. PCT/EP2014/003144, filed on Nov. 25, 2014.

(30) Foreign Application Priority Data

Dec. 9, 2013 (DE) .......................... 10 2013 113 710

(51) Int. Cl.
*F01D 25/16* (2006.01)
*F16C 35/06* (2006.01)
(Continued)

(52) U.S. Cl.
CPC ............. *F01D 25/162* (2013.01); *F01D 5/02* (2013.01); *F01D 25/04* (2013.01); *F01D 25/166* (2013.01);
(Continued)

(58) Field of Classification Search
CPC ........ F04D 13/04; F04D 13/043; F04D 25/04; F04D 29/053; F04D 29/056;
(Continued)

(56) References Cited

U.S. PATENT DOCUMENTS 4,738,548 A * 4/1988 Zloch .................... F01D 25/164
                                                        384/100
2004/0005231 A1* 1/2004 Larsson .................. F01D 25/16
                                                        417/407
(Continued)

FOREIGN PATENT DOCUMENTS

DE        7337624 U    * 10/1973    ............... F02C 7/06
DE        3601082         7/1987
WO        2009/01353 A1   1/2009

OTHER PUBLICATIONS

English machine translation of DE 7337624, Nov. 11, 2018.*

Primary Examiner — Christopher Verdier
(74) Attorney, Agent, or Firm — Klaus J. Bach

(57) ABSTRACT

In an exhaust gas turbocharger, comprising a first radial bearing and a second radial bearing configured for the radial support of a shaft of the exhaust gas turbocharger, wherein the first radial bearing comprises a bearing axis extending in alignment with the bearing axis of the second radial bearing which is arranged spaced from the first radial bearing, a third radial bearing with a third bearing axis, which is extends parallel to, but at a distance (E) from, the first bearing axis and the second bearing axis is arranged between the first and second radial bearings.

4 Claims, 1 Drawing Sheet

(51) Int. Cl.
　　　F16C 17/02　　　(2006.01)
　　　F16C 23/10　　　(2006.01)
　　　F01D 25/04　　　(2006.01)
　　　F02C 7/06　　　　(2006.01)
　　　F02B 5/02　　　　(2006.01)
　　　F02B 33/40　　　(2006.01)
　　　F02D 37/00　　　(2006.01)
　　　F04D 29/053　　(2006.01)
　　　F04D 29/056　　(2006.01)
　　　F04D 29/28　　　(2006.01)
　　　F04D 29/06　　　(2006.01)
　　　F16C 23/06　　　(2006.01)
　　　F16C 17/18　　　(2006.01)
　　　F16C 17/26　　　(2006.01)
　　　F01D 5/02　　　　(2006.01)
　　　F02B 37/00　　　(2006.01)

(52) U.S. Cl.
　　　CPC .............. *F02B 33/40* (2013.01); *F02B 37/00* (2013.01); *F02C 7/06* (2013.01); *F04D 29/053* (2013.01); *F04D 29/056* (2013.01); *F04D 29/284* (2013.01); *F16C 17/02* (2013.01); *F16C 17/028* (2013.01); *F16C 17/18* (2013.01); *F16C 17/26* (2013.01); *F16C 23/06* (2013.01); *F16C 23/10* (2013.01); *F16C 35/061* (2013.01); *F05D 2220/40* (2013.01); *F05D 2240/54* (2013.01); *F05D 2240/60* (2013.01); *F16C 2360/24* (2013.01); *Y02T 10/144* (2013.01)

(58) Field of Classification Search
　　　CPC .............. F04D 29/284; F05D 2220/40; F05D 2240/54; F05D 2240/60; F02C 7/06; F16C 17/18; F16C 17/028; F16C 35/061; F16C 2360/24; F16C 23/10
　　　USPC ........................................................ 417/407
　　　See application file for complete search history.

(56) References Cited

U.S. PATENT DOCUMENTS

2011/0048000 A1* 3/2011 Kley .................. F01D 25/16
　　　　　　　　　　　　　　　　　　　　　　　　60/598
2013/0272854 A1* 10/2013 Schmidt .............. F01D 25/16
　　　　　　　　　　　　　　　　　　　　　　　　415/170.1

* cited by examiner

BEARING DEVICE FOR A TURBOCHARGER AND TURBOCHARGER

This is a continuation-in-part application of pending international patent application PCT/EP2014/003144 filed 2014 Nov. 25 and claiming the priority of German patent application 10 2013 710.5 filed 2013 Dec. 9.

BACKGROUND OF THE INVENTION

The invention relates to a bearing device for an exhaust gas turbocharger with a first radial bearing having a first bearing axis and a second radial bearing having a second bearing axis which extends coaxially with the first bearing axis as well as to an exhaust gas turbocharger.

A principal problem with a shaft is the bending of the shaft both in the static condition, i.e. without rotation of the shaft, and in the dynamic condition, i.e. during rotation, because of its weight and, in the case of rotation, due to an imbalance. In exhaust gas turbochargers, the shaft is usually rotatably supported at two end portions of the shaft by means of radial bearings. With small exhaust gas turbochargers as they are in particular employed in passenger car engines, bending is generally moderate due to the low weight of the shaft. However, these exhaust gas turbochargers exhibit a high operating speed of far beyond 150,000 rpm so that, even with a minute imbalance, circulating vibrations or bending vibrations, respectively, are generated. Under unfavorable conditions therefore a contact between the shaft and a casing portion may take place. Additionally, oil-induced low-frequency vibrations occur which are also referred to as oil whirl or oil whip. Firstly, this leads to noise emission, and secondly to a reduction of the service life of the radial bearings and thus to a reduction of the service life of the exhaust gas turbocharger.

Patent publication DE 36 01 082 C2 discloses an exhaust gas turbocharger whose rotating assembly comprising a compressor wheel, a turbine wheel as well as a shaft, which non-rotatably connects the compressor wheel with the turbine wheel, is supported by means of a plain bearing device in a bearing portion of the exhaust gas turbocharger. The bearing device comprises a bearing bushing which virtually extends from one end of the shaft to the other end of the shaft, wherein a radial bearing each in the form of a plain bearing is provided in the end areas. To prevent the bearing bushing from being rotated, anti-rotation means are formed. In order to enable the lubricant supplied to the bearing device to be reliably discharged for preventing a so-called oil whirl or oil whip, respectively, recesses are formed in the bearing bushing between the radial bearings. A reliable rigidity of the bearing bushing is ensured by means of two lands which are formed in the area of the recesses. The manufacture of such a bearing bushing however is expensive due the lands and recesses.

It is the object of the present invention to provide a bearing device for an exhaust gas turbocharger by means of which a quasi-static support of a shaft of the exhaust gas turbocharger can be achieved. Another aspect of the invention is to provide an exhaust gas turbocharger with an improved bearing device.

SUMMARY OF THE INVENTION

In a bearing device for an exhaust gas turbocharger comprising a first radial bearing and a second radial bearing configured for the radial support of a shaft of the exhaust gas turbocharger, wherein the first radial bearing comprises a first bearing axis which extends in alignment with the bearing axis of the second radial bearing, a third radial bearing is arranged between the first and second bearings with a third bearing axis which extends parallel to the first bearing axis and the second bearing axis but at a distance (E) from them. The invention resides also in a turbocharger including such a bearing device.

This means in other words that the third bearing axis is positioned parallel offset to the first bearing axis and the second bearing axis. Thus, the third radial bearing is not in alignment with the first radial bearing and the second radial bearing, relative to the first bearing axis and the second bearing axis. As a result, the shaft which is supported by the first radial bearing and the second radial bearing has is supported in a braced condition. There is consequently a bracing force which will be referred below to as pre-tensioning force and which is applied on the shaft via the third radial bearing. A pre-tensioning force acts essentially in the radial direction and is to compensate for nonexistent rotor weight. As a result, the shaft is not only radially supported by means of the third radial bearing, but because of the third bearing axis of the third radial bearing positioned at a distance from the first bearing axis and the second bearing axis, an axial support force is indirectly provided by the pre-tensioning force on the shaft. This pre-tensioning force forces the shaft and thus the rotating assembly into a point of movement which is eccentrically positioned relative to a usual point of movement so that the rotating assembly may principally behave like a "heavy" rotating assembly, i. e. like e. g. a rotating assembly of an exhaust gas turbocharger in a truck drivetrain or like a rotating assembly of an exhaust gas turbocharger of a ship Diesel engine.

This indirect axial support can be achieved by a limited bending of the shaft of a usual bearing device with a first radial bearing and a second radial bearing, which generally occurs axially and centrally between the first radial bearing and the second radial bearing, by means of the third radial bearings in the radial direction, wherein the pre-tensioning force acts on the shaft because the shaft is prevented from its inherent bending by the third radial bearing. Thus, a quasi-statically applied force is exerted on the shaft. In other words, an additional bearing load has been created by means of an additional eccentrically positioned friction bearing, the third radial bearing, which apart from acting on the first radial bearing and the second radial bearing, also acts on the third radial bearing.

The advantage of the present invention is a reduction or elimination of the "oil slash", i. e. of oil whirl or oil whip, respectively, so that, on the one hand, a noise reduction during operation of the shaft and, on the other hand, a stable support and thus a longer service life of the shaft which is supported by the inventive bearing device are achieved.

Another advantage of the inventive bearing device is the reduction of a potential tilting of the shaft in the radial bearings, because bending or deflecting of the shaft and a resulting inclined position of the shaft in the radial bearings is significantly reduced. This is particularly advantageous for so-called floating-bushing bearings which are characterized by a movable bushing between the shaft and a stationary friction bearing housing of the friction bearing so that the shaft is accommodated in the bushing and a lubricant film is present both between the shaft and the bushing as well as between the bushing and a friction bearing housing.

It is noted that, in the inventive bearing device, the third radial bearing is preferably in the form of a friction bearing. The friction bearing is a cost-efficient bearing for supporting the shaft.

Ideally, the third radial bearing is positioned in the axial direction centrally between the first radial bearing and the second radial bearing. This position of the third radial bearing results in a further reduction of bending of the shaft, so that bending and the inclined position of the shaft in the first radial bearing as well as in the second radial bearing are reduced to a maximum degree. Consequently, this advantageous embodiment of the inventive bearing device provides for the implementation of a statically undetermined support of the shaft.

The second aspect of the invention relates to an exhaust gas turbocharger with a rotating assembly, wherein the rotating assembly comprises a compressor wheel, a turbine wheel and a shaft connecting the compressor wheel to the turbine wheel for rotation therewith, wherein the rotating assembly is rotatably supported in a bearing portion by means of a bearing device according to the invention. The invention is advantageous in that it achieves a low-noise exhaust gas turbocharger and a longer service life of the exhaust gas turbocharger due to the improved bearing device of the rotating assembly. Furthermore, friction of the exhaust gas turbocharger is considerably reduced by means of the improved bearing device, because the phenomenon of oil whirl or oil whip, respectively, is reduced by the inventive exhaust gas turbocharger, which friction normally significantly contributes to the overall friction of an exhaust gas turbocharger. This reduced friction of the inventive exhaust gas turbocharger results e. g. in a reduction of the fuel demand of an associated combustion engine, because the inventive exhaust gas turbocharger requires a lower exhaust gas mass flow for achieving the same performance of an exhaust gas turbocharger according to the state of the art.

In a particular embodiment of the inventive exhaust gas turbocharger, both, the shaft and the third radial bearing, are made from steel. This is not only beneficial for a longer service life due to the high-quality and high-strength of steel material but also for the sliding properties of the component combination shaft-radial bearing, so that a further reduction of friction may be achieved.

In a most simple and thus cost-efficient manufacturing method of the inventive exhaust gas turbocharger, the third radial bearing is positioned by means of a press fit in the bearing support portion.

Further advantages, features and details of the invention will become more readily apparent from the following description of preferred exemplary embodiments thereof with references to the accompanying drawings. The features and feature combinations as previously mentioned in the description as well as the features and feature combinations which will be mentioned in the following description of the figures and/or which are solely illustrated in the figures are not only applicable in the respective indicated combination but also in other combinations or isolated, without deviating from the scope of the invention.

DESCRIPTION OF EXEMPLARY EMBODIMENTS

Figure 1:
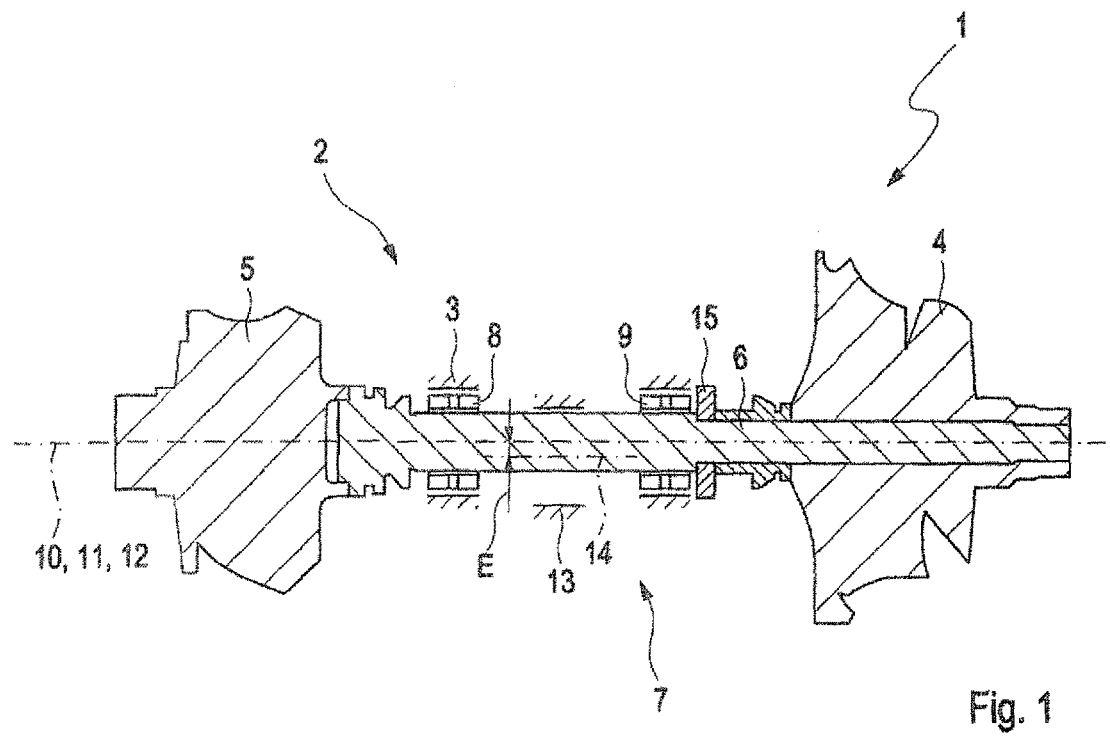
FIG. 1 shows a schematic illustration of a rotating assembly of an exhaust gas turbocharger with a bearing device according to the invention.

In an exemplary embodiment, a rotating assembly 2 of an inventive exhaust gas turbo-charger 1 is configured according to FIG. 1. The exhaust gas turbocharger 1 comprises a flow-through exhaust gas guide portion (not shown in detail) through which a fluid, generally exhaust gas, flows during operation of the exhaust gas turbocharger 1. The exhaust gas is generally but not necessarily a combustion product of a combustion engine (not shown in detail).

The exhaust gas turbocharger 1 is associated with a flow-through air guide portion (not shown in detail) as well as with a bearing portion 3 positioned between the exhaust gas guide portion and the air guide portion, wherein the rotating assembly 2 is rotatably accommodated in the bearing portion 3. The rotating assembly 2 comprises a compressor wheel 4 and a turbine wheel 5 which are non-rotatably connected with each other by means of a shaft 6. The compressor wheel 4 is arranged in a compressor wheel chamber (not shown in detail) of the air guide portion for the intake of generally fresh air. The turbine wheel 5 is rotatably accommodated in a wheel chamber (not shown in detail) of the exhaust gas guide portion.

During operation of the exhaust gas turbocharger 1, the turbine wheel 5 is subjected to the exhaust gas flowing through the exhaust gas guide portion and driven by it, so that it may perform a rotary motion. This rotary motion is transferred to the compressor wheel 4 by means of the shaft 6, which rotates with the turbine wheel 5. By means of the compressor wheel 4 and its rotary motion fresh air is sucked-in and compressed.

The shaft 6 of the rotating assembly 2 is rotatably supported in the bearing portion 3 by means of a bearing device 7, comprising a first radial bearing 8 and a second radial bearing 9. For the axial support, an axial bearing 15 is additionally provided in the area of the compressor wheel 4. In the present exemplary embodiment, the first radial bearing 8 and the second radial bearing 9 are in the form of floating bush bearings.

The first radial bearing 8 has a first bearing axis 10 which is positioned coaxially to a second bearing axis 11 of the second radial bearing 9. Ideally, an axis of rotation 12 of the rotating assembly in an operating condition corresponds to the first bearing axis 10 or the second bearing axis 11, respectively.

A third radial bearing 13 with a third bearing axis 14 is provided in the bearing portion 3. The third radial bearing 13 is accommodated in the bearing portion 3 in such a manner that the third bearing axis 14 is arranged parallel to the first bearing axis 10 or the second bearing axis 11, respectively, while maintaining a radial distance E. The third radial bearing 13 is positioned between the first radial bearing 8 and the second radial bearing 9 and equally spaced from both, in other words centrally between the first radial bearing 8 and the second radial bearing 9, to generate a pre-tensioning force.

Due to its eccentric positioning, the third radial bearing 13 effects in the bearing portion 3 quasi-static bearing forces Fstat which lead to a quasi-static support of 13 effects the rotating assembly 2. Due to the arrangement of the third radial bearing 13 in the bearing portion 3, the rigidity of the first radial bearing 8, of the second radial bearing 9 as well as of the third radial bearing 13 itself is considerably higher than with a coaxial positioning of the third radial bearing 13 and the first radial bearing 8 or the second radial bearing 9, respectively.

The radial distance E is a measure for a so-called quasi-static load (F-stat). The greater this distance E is selected, the higher is the quasi-static load. With such a quasi-static load, a reduction of the so-called oil swirl or oil whip, respectively, is achieved, but the static load should not exceed a certain limit, because under certain circumstances friction losses will not be reduced but increased. However, this is primarily dependent on the size of the exhaust gas turbocharger 1, of its operating range, and in particular of a speed. Other dependencies result from the lubricant employed in the exhaust gas turbocharger 1, in particular lubricating oil. Different oils exhibit different viscosities, and the distance E is also depending on the oil employed in the exhaust gas turbocharger 1. This means that the optimum distance E for a particular exhaust gas turbocharger 1 is to be determined by means of a computer simulation.

The optimum distance E is determined so as to result in a reduction, in particular, the complete elimination, of sub-synchronous movements of the shaft 6 over a large speed range, in the best case over the entire speed range. The term sub-synchronous movement of the shaft 6 refers to vibrations of the shaft 6 in proportional relation to a rotor speed, that is, the speed of the shaft 6.

Figure 2:
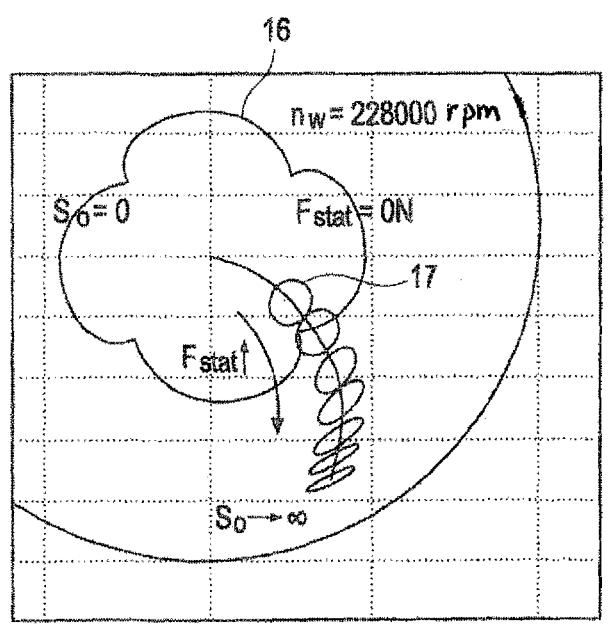
FIG. 2 shows a diagram of a center point position of a shaft of a rotating assembly as a function of a pre-tensioning force of the inventive bearing device.

FIG. 2 shows a diagram with results of a computer simulation of the movement of the shaft 6 at a speed $n_w$ of 228,000 rpm, A first movement curve 16 represents a center point movement of the shaft 6, which the shaft 6 describes at a speed of 228,000 rpm, exclusively supported by the first radial bearing 8 and the second radial bearing 9, i. e. without the third radial bearing 13. Already the positioning of the third radial bearing 13 with its axis 14 at a small radial distance E from the first bearing axis 10 and the second bearing axis 11 and consequently under a low additional pre-tensioning force, yields a significant reduction of the center point movement of the shaft 6 according to the second movement curve 17. With an increasing pre-tensioning force, that is with an increasing distance E, the movement curve or the shaft orbit So respectively, decreases. The smaller the shaft orbiting curve is the smaller is the vibration of the shaft 6. The possibility of an oil whirl or oil whip of the shaft 6 generally occurs at higher speeds, so that noise emission as well as a risk of damage are reduced.

Ideally, steel is a particularly preferred material for fabricating the shaft 6 as well as the third radial bearing 13 which is configured as a circular cylindrical and fully enclosed plain bearing. Principally, any material may be preferred which exhibits high impact strength together with high abrasion resistance.

In an alternative embodiment, the third radial bearing 13 could also be configured as a so-called two-lobe bearing, a tilting pad bearing or a multiple-cone bearing. The advantage of these bearing configurations is a shift of potential oil whirl or oil whip towards higher speeds compared to a general cylindrical plain bearing.

What is claimed is:

1. An exhaust gas turbocharger with a rotating assembly (2), the rotating assembly (2) comprising a compressor wheel (4), a turbine wheel (5) and a shaft (6) connecting the compressor wheel (4) to the turbine wheel (5) for rotation with the turbine wheel (5), wherein the rotating assembly (2) is rotatably supported in a bearing portion (3) by a bearing arrangement (7) comprising a first radial bearing (8), a second radial bearing (9) spaced from the first radial bearing, each being configured for the radial support of the shaft (6) of the exhaust gas turbocharger (1), the first radial bearing (8) having a first bearing axis (10) and the second radial bearing (9) having a second bearing axis (11) extending coaxially with the first bearing axis (10), and a third radial bearing (13) arranged between the first and second spaced radial bearings (8, 9) and having a third bearing axis (14) which extends parallel to the first bearing axis (10) and to the second bearing axis (11) but at a radial distance (E) from the first and second bearing axes.

2. The bearing device according to claim 1, wherein the third radial bearing (13) is a friction bearing and the first and second radial bearings (8, 9) are floating radial bush bearings.

3. The exhaust gas turbocharger according to claim 1, wherein both the shaft (6) and the third radial bearing (13) are made from steel.

4. The exhaust gas turbocharger according to claim 1, wherein the third radial bearing (13) is mounted in a bearing support portion (3) by means of a press fit.

\* \* \* \* \*

UNITED STATES PATENT AND TRADEMARK OFFICE
CERTIFICATE OF CORRECTION

PATENT NO. : 10,428,691 B2
APPLICATION NO. : 15/173638
DATED : October 1, 2019
INVENTOR(S) : Koehl et al.

Page 1 of 1

It is certified that error appears in the above-identified patent and that said Letters Patent is hereby corrected as shown below:

On the Title Page

Item (72) the listing of inventors should be listed as follows:
Wolfgang Kohl, Darmstadt (DE)
Richard Markert, Darmstadt (DE)
Martin Kreschel, Mannheim (DE)
Dietmar Filsinger, Wiesloch (DE)

Signed and Sealed this
Ninth Day of June, 2020

Andrei Iancu
*Director of the United States Patent and Trademark Office*